US011659927B2

(12) United States Patent
Chiu et al.

(10) Patent No.: US 11,659,927 B2
(45) Date of Patent: May 30, 2023

(54) SLIDE ASSEMBLY

(71) Applicant: Nan Juen International Co., Ltd., Taoyuan (TW)

(72) Inventors: I-Hsiang Chiu, Taoyuan (TW); Chen-Lu Fan, Taoyuan (TW); Jie-Ru Ning, Taoyuan (TW); Daniel Francisco Martinez Molina, Taoyuan (TW)

(73) Assignee: Nan Juen International Co., Ltd., Taoyuan (TW)

( * ) Notice: Subject to any disclaimer, the term of this patent is extended or adjusted under 35 U.S.C. 154(b) by 0 days.

(21) Appl. No.: 17/709,443

(22) Filed: Mar. 31, 2022

(65) Prior Publication Data
US 2023/0128768 A1    Apr. 27, 2023

(30) Foreign Application Priority Data
Oct. 25, 2021  (TW) .................................. 110139764

(51) Int. Cl.
*A47B 88/443* (2017.01)
*A47B 88/50* (2017.01)
*F16C 29/02* (2006.01)
*F16C 29/10* (2006.01)
*F16C 29/00* (2006.01)

(52) U.S. Cl.
CPC ............ *A47B 88/443* (2017.01); *A47B 88/50* (2017.01); *F16C 29/005* (2013.01); *F16C 29/02* (2013.01); *F16C 29/10* (2013.01); *A47B 2210/0016* (2013.01)

(58) Field of Classification Search
CPC .................. A47B 88/50; A47B 88/443; A47B 2210/0016; F16C 29/02; F16C 29/005
USPC ......................................................... 312/333
See application file for complete search history.

(56) References Cited

U.S. PATENT DOCUMENTS

| | | | |
|---|---|---|---|
| 6,450,600 B1* | 9/2002 | Chen .................... | A47B 88/493 312/334.46 |
| 7,731,312 B2* | 6/2010 | Chen ..................... | A47B 88/57 312/334.46 |
| 9,939,014 B1* | 4/2018 | Chiu ....................... | F16C 29/02 |
| 11,149,789 B2* | 10/2021 | Tang ..................... | F16C 29/008 |
| 2005/0017614 A1* | 1/2005 | Cirocco ................ | A47B 88/49 312/333 |
| 2006/0120636 A1* | 6/2006 | Chen .................... | A47B 88/443 384/18 |

* cited by examiner

*Primary Examiner* — James O Hansen
(74) *Attorney, Agent, or Firm* — Demian K. Jackson; Jackson IPG PLLC

(57) ABSTRACT

A slide assembly includes a channel member including a stop recess having a front end and a rear end; a slide member including a sliding first portion, a sliding second portion, a slot, and a connection portion on the sliding first portion, the slide member being configured to move in the channel member; and a release mechanism disposed on the slide member and including first and second release member. In a locked state the first limit members of the positioning portion of the first release member engage with the front larger hole of the stop recess, the second limit members of the positioning portion of the first release member engage with the rear smaller hole of the stop recess, and the elastic arm of the second release member engages with the rear smaller hole of the stop recess. A double release mechanism is provided.

6 Claims, 10 Drawing Sheets

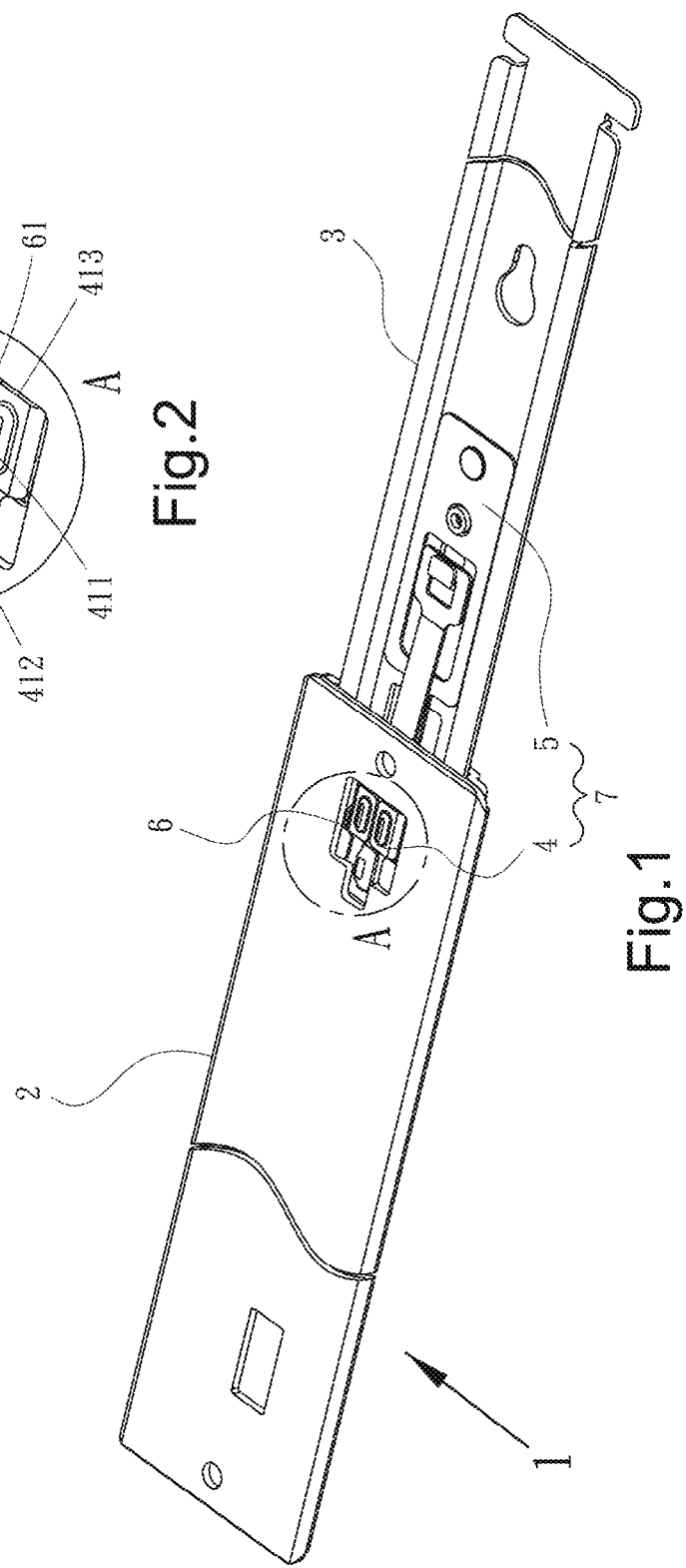
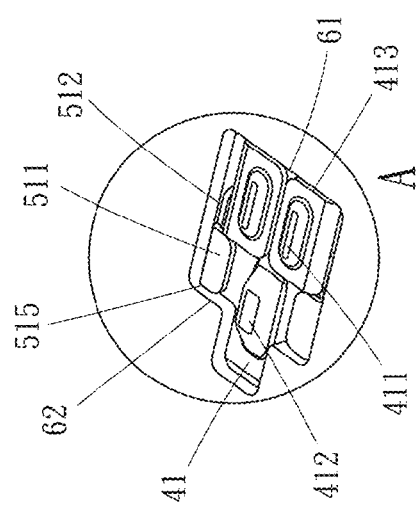
Fig.2

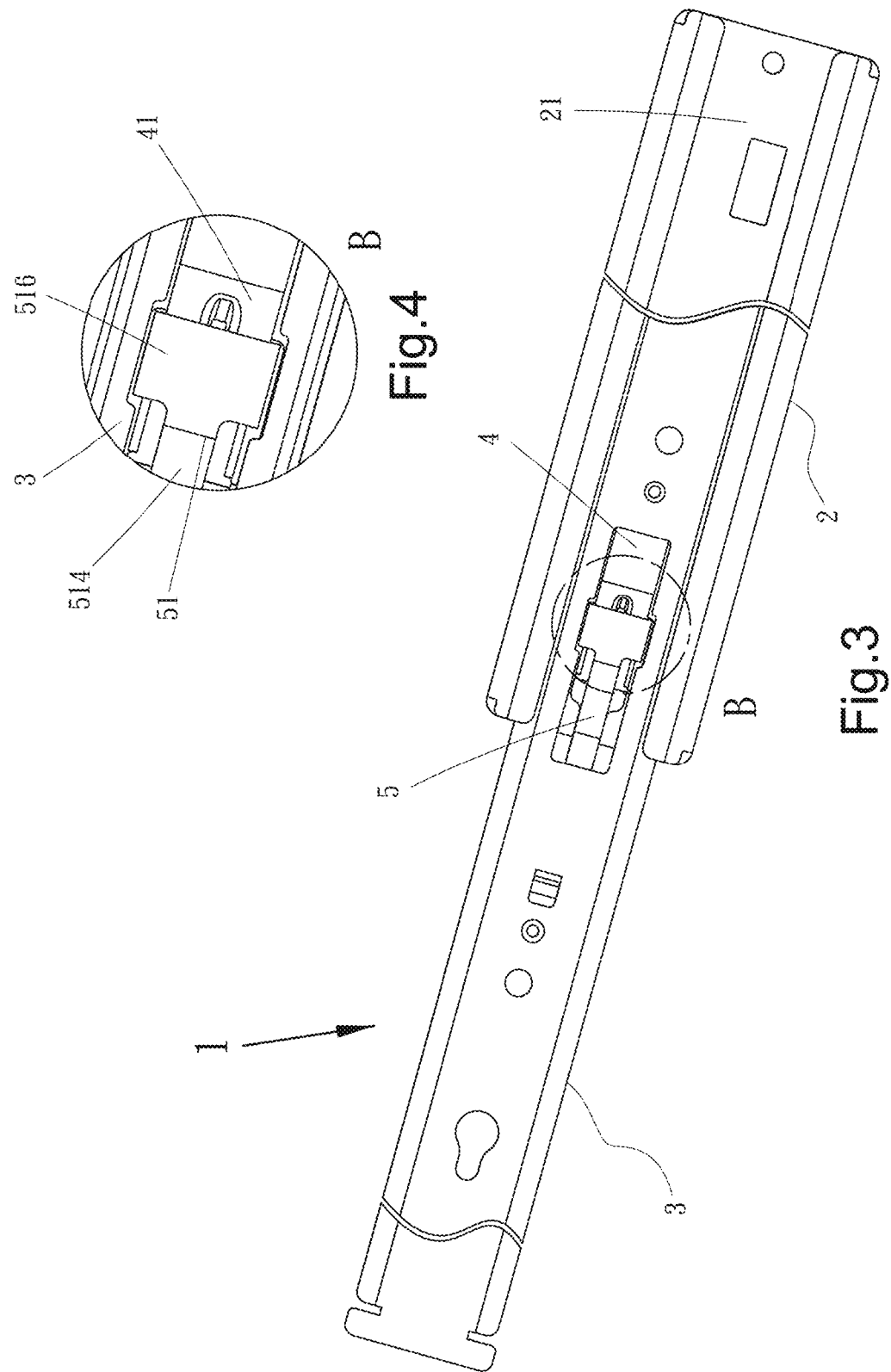

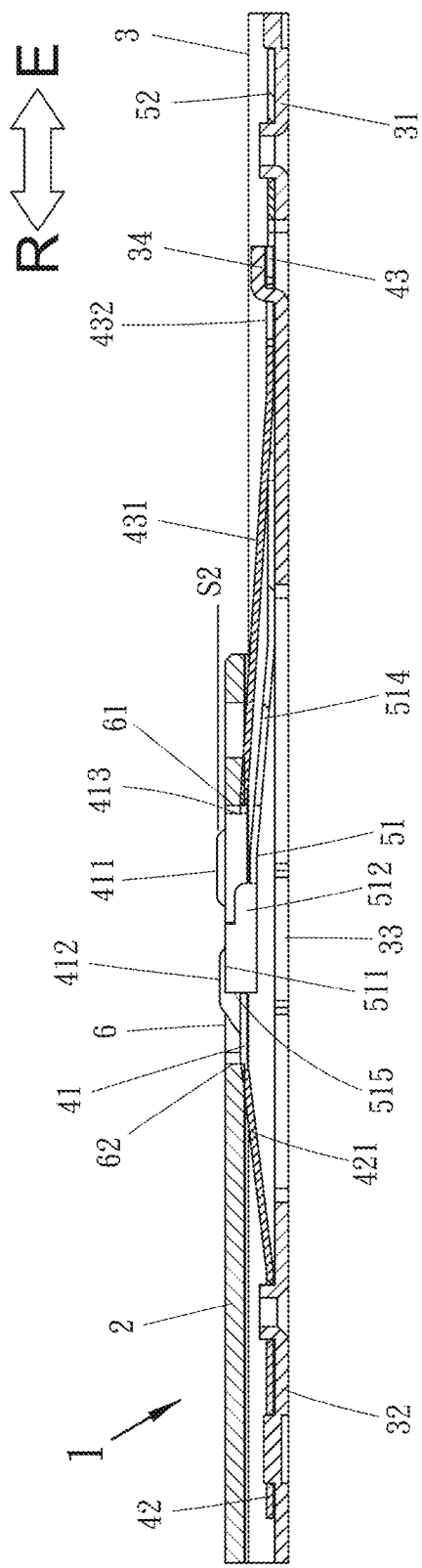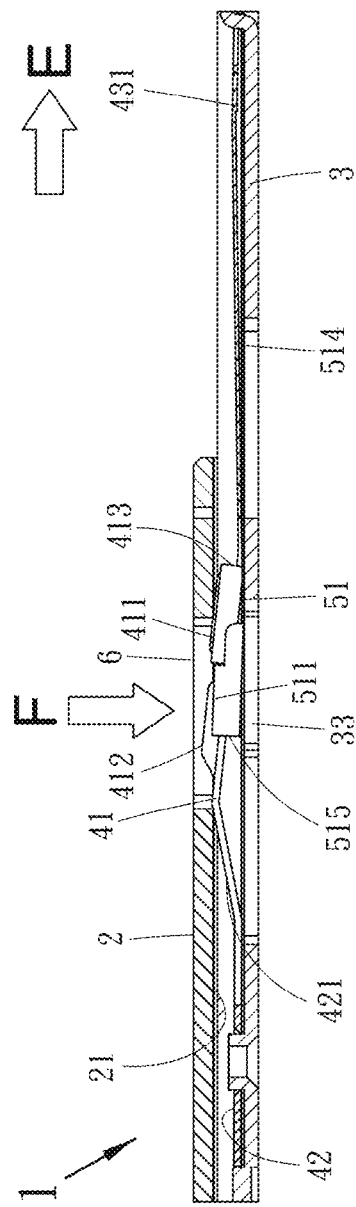

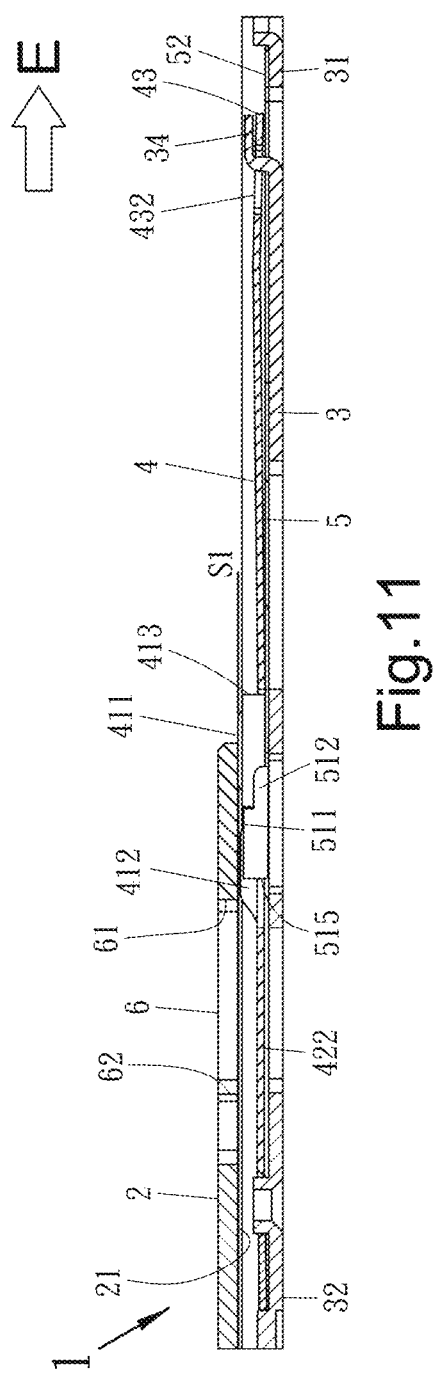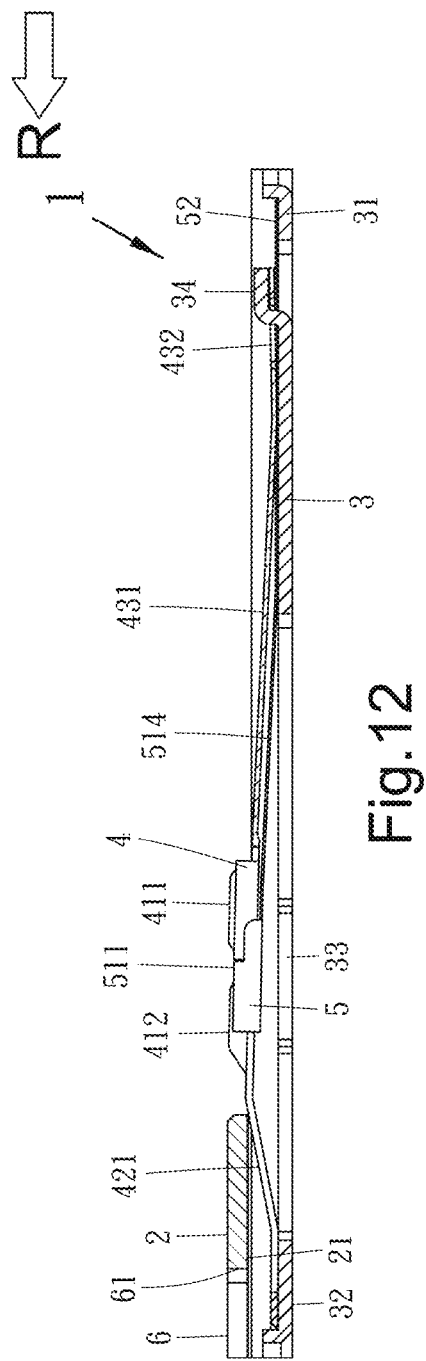

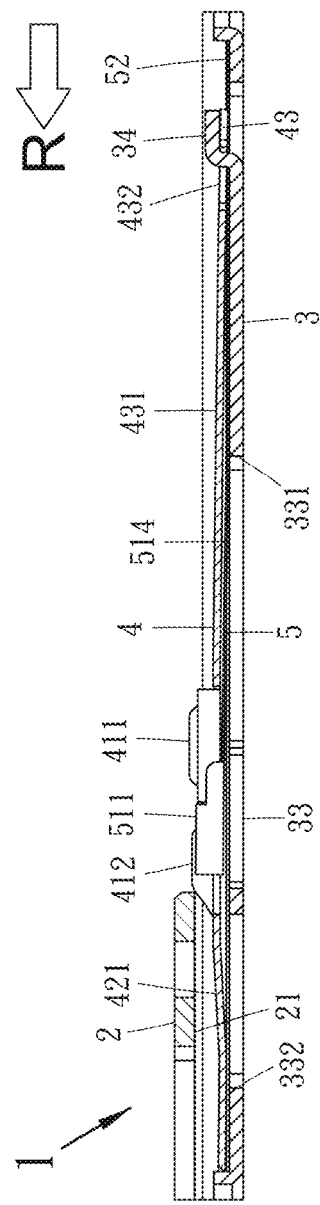
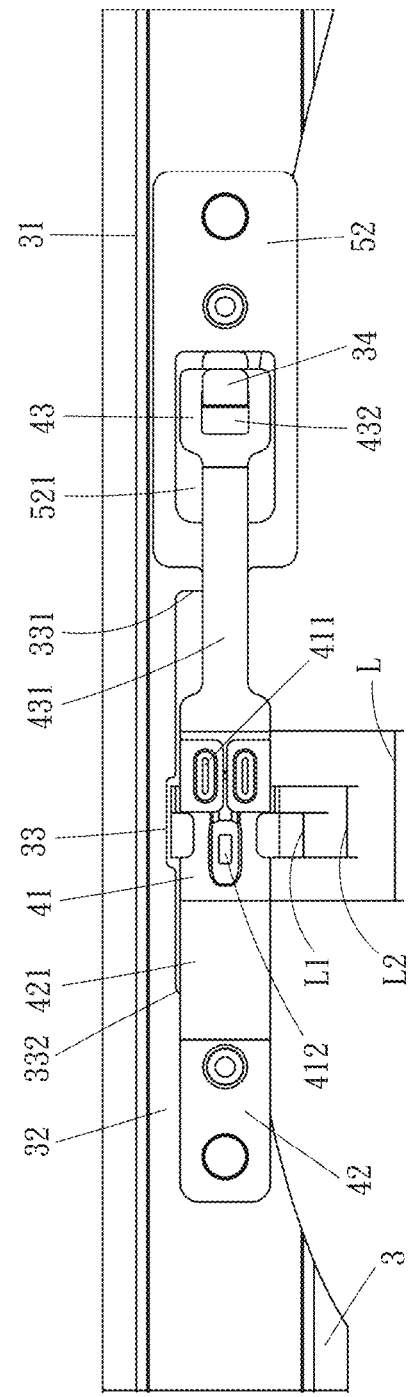

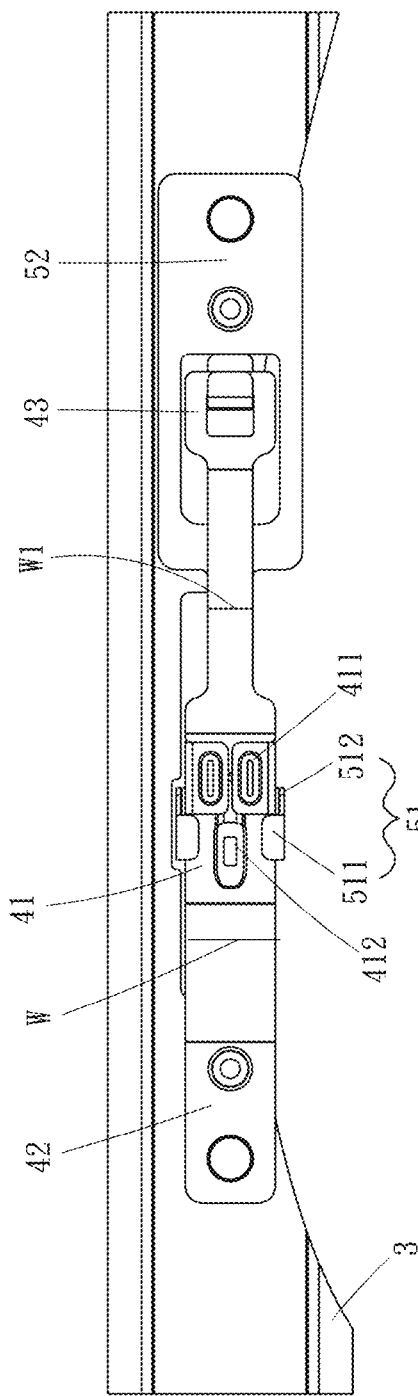
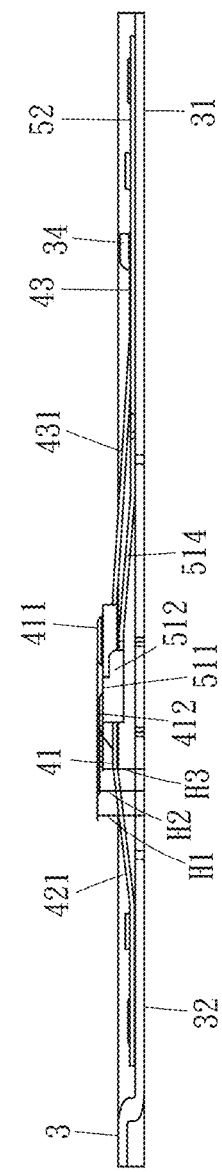

SLIDE ASSEMBLY

FIELD OF THE INVENTION

The invention relates to slides and more particularly to a slide assembly having a double release mechanism so that either pulling out or pushing in operation of a slide member can be correctly carried out.

BACKGROUND OF THE INVENTION

U.S. Pat. No. 9,939,014 B2 to Chiu et al. discloses a slide rail displacement positioning mechanism comprising a slide rail assembly including an inner slide rail, an outer slide rail, a stopper member affixed to the inner slide rail for providing a positioning gap between a frame body and an abutment component thereof, and a positioning member affixed to the outer slide rail and adapted to elastically bias the abutment component upon a relative movement between the stopper member and the positioning member subject to the operation of the slide rail assembly. The positioning member can be positively stopped by the frame body to achieve relative positioning between the outer slide rail and inner slide rail of the slide rail assembly.

However, the patent requires an additional positioning member affixed to the outer slide rail is required and the stopper member is affixed to the inner slide rail. This inevitably decreases precious space. Thus, continuing improvements in the exploitation of slide assembly of this type are constantly sought.

SUMMARY OF THE INVENTION

It is therefore one object of the invention to provide a slide assembly comprising a channel member including a stop recess having a front larger hole and a rear smaller hole; a slide member including a sliding first portion, a sliding second portion, a slot, and a connection portion on the sliding first portion, the slide member being configured to move in the channel member; and a release mechanism disposed on the slide member and including a first release member and a second release member; wherein the first release member includes a connection portion having a connection section and a connection hole secured to the connection portion of the slide member, a guiding portion secured to the sliding second portion of the slide member, and a positioning portion interconnecting the connection portion and the guiding portion and having two bent first limit members on two sides respectively; wherein the second release member includes a fastening portion secured to the sliding first portion of the slide member, and an elastic arm formed with the fastening portion and having two second limit members on two sides respectively A; wherein the fastening portion of the second release member is secured to the sliding first portion of the slide member and the guiding portion of the first release member is secured to the sliding second portion of the slide member respectively; wherein the elastic arm of the second release member engages with the positioning portion of the first release member; wherein the first release member is secured onto the second release member; wherein in a locked state the first limit members of the positioning portion of the first release member engage with the front larger hole of the stop recess, the second limit members of the positioning portion of the first release member engage with the rear smaller hole of the stop recess, and the elastic arm of the second release member engages with the rear smaller hole of the stop recess; and wherein in response to pressing the positioning portion of the first release member, both the first and second release members move toward the slot of the slide member to disengage the elastic arm of the second release member from the rear smaller hole of the stop recess so that the slide member is capable of moving in the channel member.

Preferably, the first release member is formed by punching, the positioning portion of the first release member includes a raised first guiding section and a raised second guiding section which is raised, the guiding portion of the first release member includes a guiding section engaged with the channel member, and the guiding section is a curved surface or inclined surface.

Preferably, the second release member is formed by punching, the elastic arm of the first release member are bent upwardly, inwardly to form a first groove portion and a second groove portion, height of the first groove portion of the elastic arm is less than height of the first guiding section of the positioning portion of the first release member, and height of the first groove portion of the elastic arm is less than height of the second guiding section of the positioning portion of the first release member respectively.

Preferably, the fastening portion of the second release member includes a fastening hole formed with the elastic arm, and both the connection portion of the slide member and the connection portion of the first release member are fastened in the fastening hole.

Preferably, the guiding portion includes a guiding section urging against the channel member, and width of the guiding section of the guiding portion is greater than width of the connection section of the connection portion of the first release member.

Preferably, two sides of the elastic arm of the second release member are bent upwardly, inwardly to form a first groove portion and a second groove portion, and length of the positioning portion of the first release member is greater than each of length of the first groove portion of the elastic arm and length of the second groove portion of the elastic arm respectively.

The above and other objects, features and advantages of the invention will become apparent from the following detailed description taken with the accompanying drawings

BRIEF DESCRIPTION OF THE DRAWINGS

FIG. 1 is a perspective view of a slide assembly of the invention, viewed from outside;

FIG. 2 is an enlarged view of circle A in FIG. 1;

FIG. 3 is another perspective view of the slide assembly, viewed from inside;

FIG. 4 is an enlarged view of circle B in FIG. 3;

FIG. 9 is a longitudinal sectional view showing the release mechanism locked between the channel member and the slide member;

FIG. 10 is a longitudinal sectional view showing the release mechanism pressed to move in a pulling out operation;

FIG. 11 is a longitudinal sectional view showing the release mechanism leaving the locked state;

FIG. 12 is a longitudinal sectional view showing the release mechanism moving in a pushing in operation;

FIG. 13 is a longitudinal sectional view showing the release mechanism, the channel member, and the slide member in the pushing in operation;

FIG. 14 is a longitudinal sectional view showing lengths of the first release member and the second release member;

FIG. 15 is a longitudinal sectional view showing widths of the first release member and the second release member; and FIG. 16 is a longitudinal sectional view showing heights of the first release member and the second release member.

DETAILED DESCRIPTION OF THE INVENTION

Figure 5A:
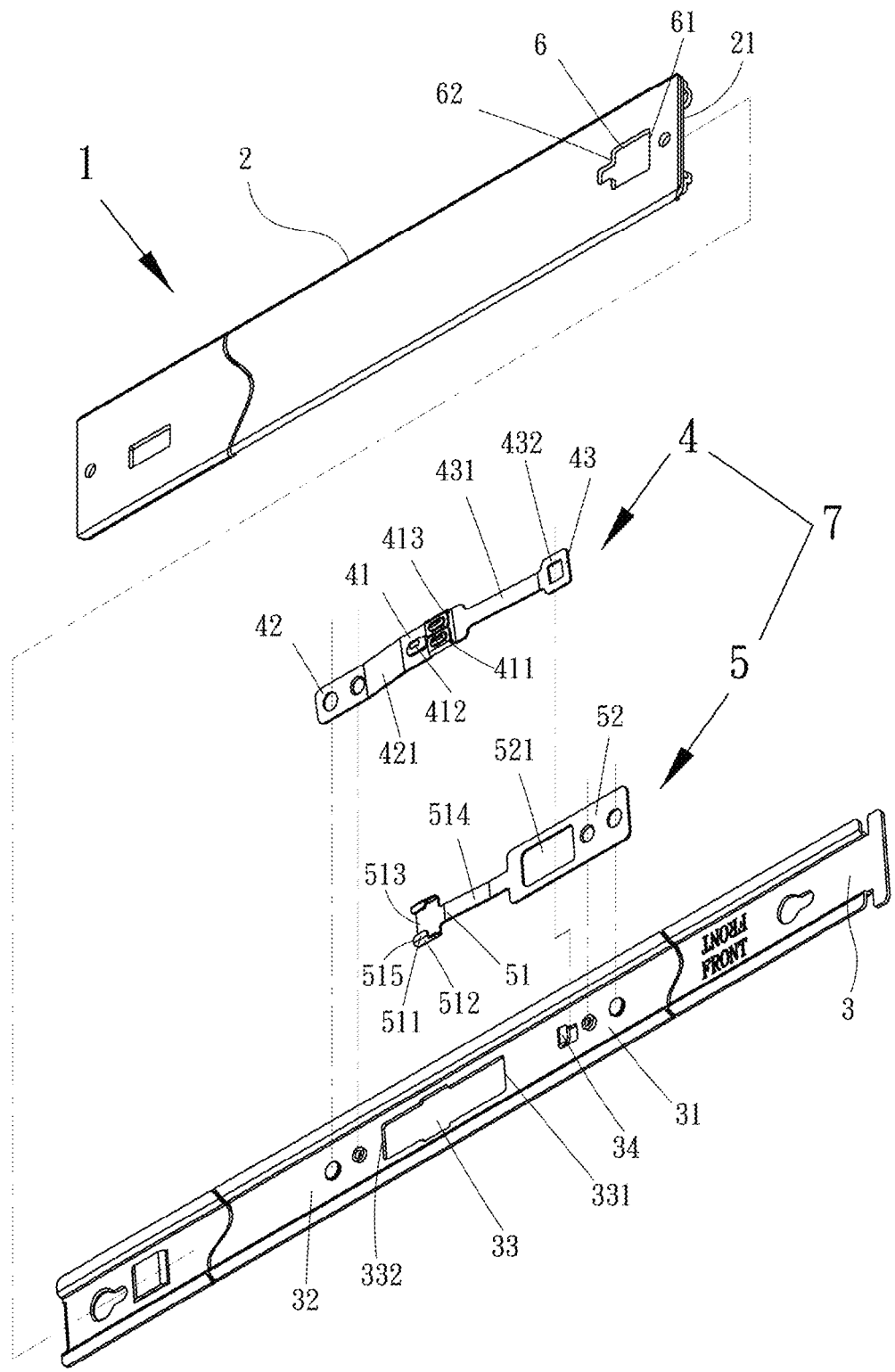
FIG. 5A is an exploded view of the slide assembly.

Referring to FIGS. 1 to 16, a slide assembly 1 in accordance with the invention comprises a channel member 2, a slide member 3 adapted to move in the channel member 2, and a release mechanism 7 provided on the slide member 3 as discussed in detail below.

The channel member 2 includes a stop recess 6 having a front end 61 and rear end 62. The release mechanism 7 includes a first release member 4 and a second release member 5. In a locked S2, a positioning portion 41 of the first release member 4 is bent to form a first limit member 413 which engages with the front end 61 of the stop recess 6 to be locked. Also, an elastic arm 51 of the second release member 5 is formed with an elastic portion 514. The elastic arm 51 engages with the rear end 62 of the stop recess 6 to be locked. The elastic arm 51 has two sides bent to form two second limit members 515 respectively. The elastic arm 51 of the second release member 5 upwardly engages with the positioning portion 41 of the first release member 4. Thus, the release mechanism 7 engages with the stop recess 6 to form a double release mechanism.

As shown in FIG. 2 specifically, the positioning portion 41 of the first release member 4 includes a raised first guiding section 411 and a raised second guiding section 412. The positioning portion 41 has two sides bent to form two first limit members 413 respectively.

As shown in FIGS. 3 and 4 specifically, in a locked state S2, the elastic arm 51 of the second release member 5 engages with the positioning portion 41 of the first release member 4. For entering an unlocked state S2, the release mechanism 7 is unlocked by finger pressing the positioning portion 41 of the first release member 2 to clear a slot 33 of the slide member 3.

Figure 5B:
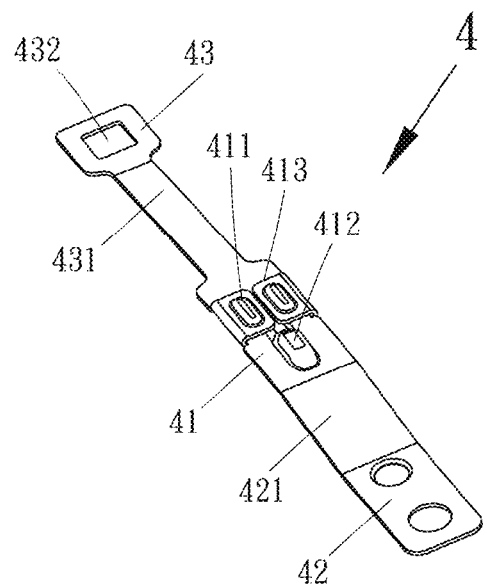
FIG. 5B is a perspective view of the first release member.
Figure 5C:
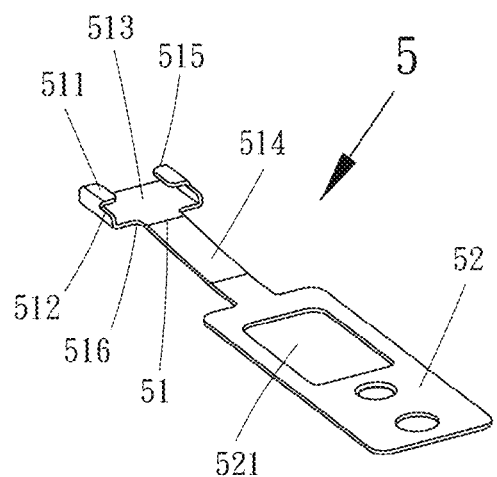
FIG. 5C is a perspective view of the second release member.

As shown in FIGS. 5A to 5C specifically, the release mechanism 7 includes a first release member 4 and a second release member 5. The channel member 2 includes a first surface 21. The stop recess 6 includes the front end 61 and the rear end 62. The slide member 3 includes a sliding first portion 31, a sliding second portion 32, a slot 33, and a connection portion 34. The slot 33 includes a front slot portion 331 and a rear slot portion 332. The release mechanism 7 is secured to the slide member 3. The first release member 4 is secured onto the second release member 5. A fastening portion 52 of the second release member 5 is secured to the sliding first portion 31 and a guiding portion 42 of the first release member 4 is secured to the sliding second portion 32 respectively.

As shown in FIG. 5B specifically, the first release member 4 is bent and further comprises a guiding portion 42 and a connection portion 43 formed with the positioning portion 41 which is in turn formed with the guiding portion 42. The first limit member 413 is formed by bending one side of the positioning portion 41. The positioning portion 41 is raised to form a first guiding section 411 and a second guiding section 412. The guiding portion 42 is secured to the sliding second portion 32. The guiding portion 42 includes a guiding section 421. The connection portion 43 includes a connection section 431 and a connection hole 432 secured to the connection portion 34.

As shown in FIG. 5C specifically, the second release member 5 is shaped as an arm and includes a fastening portion 52 secured to the sliding first portion 31. The fastening portion 52 includes a fastening hole 521. The fastening portion 52 is formed with the elastic portion 514 which is in turn formed with the elastic arm 51. The elastic arm 51 of the second release member 5 includes an elastic surface 513 and an elastic surface 516 on a bottom of the elastic surface 513. Two sides of the elastic surface 513 are bent upwardly, inwardly to form a first groove portion 511 and a second groove portion 512. Two second limit members 515 are each formed at an end of the first groove portion 511.

Figure 6A:
FIGS. 6A, 6B, 6C, and 6D are side elevations of the slide assembly showing a movement of the release mechanism between the channel member and the slide member respectively.
Figure 6B:
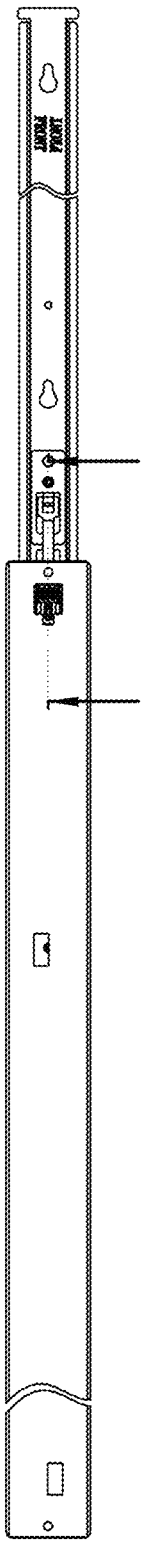
Figure 6C:
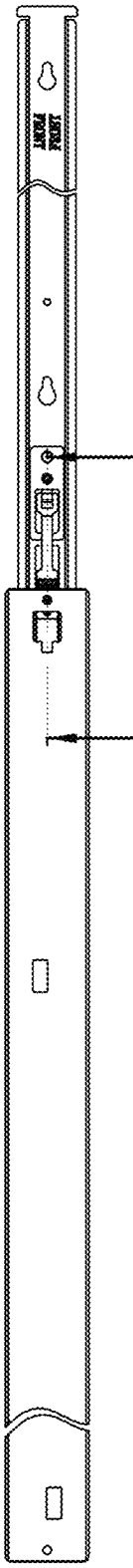
Figure 6D:

As shown in FIG. 6A specifically, the release mechanism 7 is in a unlocked state and moves toward a pulling out position between the channel member 2 and the slide member 3. As shown in FIG. 6B, the release mechanism 7 is in the locked state S2 between the slide member 3 and the channel member 2. As shown in FIG. 6C, the release mechanism 7 moves toward the pulling out position after leaving the locked state S2. As shown in FIG. 6D, the release mechanism 7 moves from the pulling out position to a pushing in position.

Figure 7:
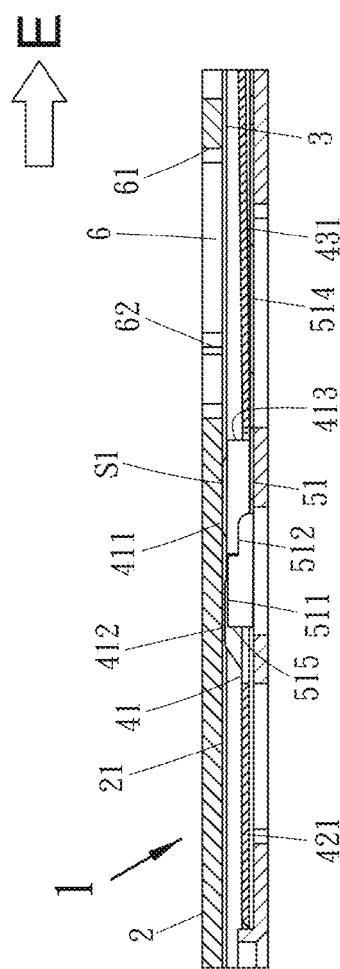
FIG. 7 is a longitudinal sectional view showing the release mechanism between the channel member and the slide member.

As shown in FIG. 7 specifically, in the unlocked state S1 of the release mechanism 7, the elastic arm 51 of the second release member 5 is pressed by the positioning portion 41 of the first release member 4 and is elastically deformed to dispose between the channel member 2 and the slide member 3. The first guiding section 411 of the positioning portion 41 contacts the first surface 21 of the channel member 2 so that the slide member 3 may move. The first guiding section 411 is raised so that a friction between the channel member 2 and the slide member 3 is decreased to a minimum. As a result, the pushing in or the pulling out operation of a drawer incorporating the slide assembly 1 is made easy.

Figure 8:
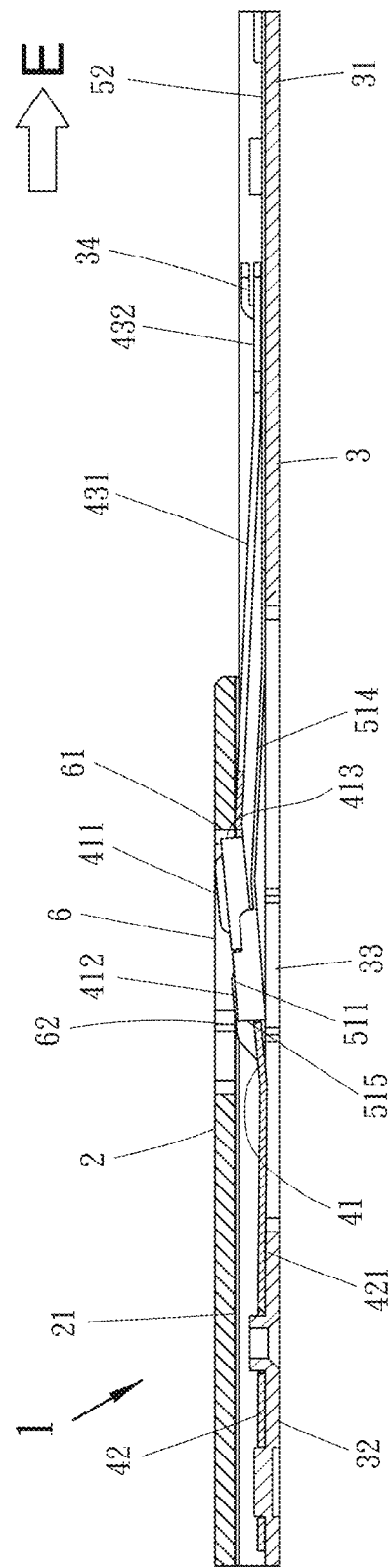
FIG. 8 is a longitudinal sectional view showing the release mechanism moving in a pulling out operation.

As shown in FIG. 8 specifically, the release mechanism 7 leaves the unlocked state S1 to enter the locked state S2 in which the slide member 3 moves toward a pulling out position, the first guiding section 411 of the first release member 4 clears the first surface 21 of the channel member 2, the guiding portion 42 of the first release member 4 has a guiding section 421 which can release an elastic force to engage the first limit member 413 of the positioning portion 41 with the front end 61 of the stop recess 6, and the first limit member 413 is a bent elastic piece. The second guiding section 412 of the first release member 4 continues to engage with the first surface 21 of the channel member 2 so that the release mechanism 7 has sufficient time to rebound to lock in the stop recess 6 which serves as a detent.

As shown in FIG. 9 specifically, a pulling out direction is labeled by E and a pushing in direction is labeled by R. In the locked state S2 of the release mechanism 7, both the first release member 4 and the second release member 5 are locked in the stop recess 6 of the channel member 2. The first limit member 413 of the positioning portion 41 is locked in the stop recess 6 by the rebounding guiding section 421.

Also, the first limit member 413 engages with the front end 61 of the stop recess 6 in an initial locked state in which the first limit member 413 is a bent elastic piece. The second limit member 515 of the elastic arm 51 is locked in the stop recess 6 by the rebounding elastic portion 514. Also, the second limit member 515 engages with the rear end 62 of the stop recess 6 in a final locked state in which the second limit member 515 is an elastic piece. As a result, a double release mechanism is formed.

As shown in FIG. 10 specifically, the release mechanism 7 leaves the locked state S2 to enter the unlocked state S1 to move toward a pulling out position by finger pressure on the release mechanism 7 until the release mechanism 7 reaches the slot 33. In detail, pressing the positioning portion 41 of the first release member 4 moves the positioning portion 41. Also, pressing the elastic arm 51 of the second release member 5 causes the elastic arm 51 to clear the stop recess 6. The guiding section 411 of the positioning portion 41 engages with the channel member 2 to elastically compress the first release member 4 initially. The first release member 4 includes a positioning portion 41 having a raised portion formed as a first guiding section 411. The first guiding section 411 is adapted to space the slide member 3 from the channel member 1. Thus, the slide member 3 can continuously move toward the pulling out position. The first release member 4 exerts an elastic force to urge against the second release member 5 in a further step. As a result, the slide member 3 moves relative to the channel member 2.

As shown in FIG. 11 specifically, the release mechanism 7 is in the unlocked state S1, the first guiding section 411 of the positioning portion 41 rebounds to be in the unlocked state S1 again. The first guiding section 411 of the positioning portion 41 engages with the first surface 21 of the channel member 2. The positioning portion 41 of the first release member 4 elastically urges against the elastic arm 51 of the second release member 5.

As shown in FIG. 12 specifically, the release mechanism 7 moves from the pulling out position to the pushing in position. The guiding section 421 of the guiding portion 42 urges against the channel member 2 so that the first release member 4 is elastically deformed initially. Also, height of the second guiding section 412 of the positioning portion 41 is decreased.

As shown in FIG. 13 specifically, as the release mechanism 7 continuously moves toward the pushing in position, the second guiding section 412 of the positioning portion 41 urges against the channel member 2. Also, the first release member 4 is elastically deformed to urge against the second release member 5 in a further step. The second guiding section 412 is raised so that the slide member 3 can be easily pushed in the channel member 2 or pulled out of the channel member 2. The first release member 4 includes a positioning portion 41 which is raised. The positioning portion 41 includes a first guiding section 411 to space the slide member 3 from the channel member 2. Thus, the slider member 3 may easily move toward the pushing in position.

As shown in FIG. 14 specifically, length L of the positioning portion 41 of the first release member 4 is greater than length L1 of the first groove portion 511 of the elastic arm 51 and length L of the positioning portion 41 of the first release member 4 is greater than length L2 of the second groove portion 512 of the elastic arm 51 respectively. Thus, noise generated when the release mechanism 7 enters or leaves the stop recess 6 is decreased to a minimum.

Referring to FIG. 15 specifically, the first release member 4 is shaped as a curve and engages with the second release member 5. Width W of the guiding section 421 of the guiding portion 42 is greater than width W1 of the connection section 431 of the connection portion 43. A figure pressure exerted on the first release member 4 can elastically deform the first release member 4. Advantageously, the above configuration can decrease the exerted finger pressure to a minimum.

As shown in FIG. 16 specifically, height H3 of the first groove portion 511 of the elastic arm 51 is less than height H1 of the first guiding section 411 of the positioning portion 41 and height H3 of the first groove portion 511 of the elastic arm 51 is less than height H2 of the second guiding section 412 of the positioning portion 41 respectively. This facilitates a movement of the first guiding section 411 relative to the first surface 21 of the channel member 2.

While the invention has been described in terms of preferred embodiments, those skilled in the art will recognize that the invention can be practiced with modifications within the spirit and scope of the appended claims.

What is claimed is:

1. A slide assembly, comprising:
   a channel member including a stop recess having a front end and a rear end;
   a slide member including a sliding first portion, a sliding second portion, a slot, and a connection portion on the sliding first portion, the slide member being configured to move in the channel member; and
   a release mechanism disposed on the slide member and including a first release member and a second release member;
   wherein the first release member includes a connection portion having a connection section and a connection hole secured to the connection portion of the slide member, a guiding portion secured to the sliding second portion of the slide member, and a positioning portion interconnecting the connection portion and the guiding portion and having two bent first limit members on two sides respectively;
   wherein the second release member includes a fastening portion secured to the sliding first portion of the slide member, and an elastic arm formed with the fastening portion and having two second limit members on two sides respectively;
   wherein the fastening portion of the second release member is secured to the sliding first portion of the slide member and the guiding portion of the first release member is secured to the sliding second portion of the slide member respectively;
   wherein the elastic arm of the second release member engages with the positioning portion of the first release member;
   wherein the first release member is secured onto the second release member;
   wherein in a locked state the first limit members of the positioning portion of the first release member engage with the front end of the stop recess, the second limit members of the elastic arm of the second release member engage with the rear end of the stop recess, and the elastic arm of the second release member engages with the rear end of the stop recess; and
   wherein in response to pressing the positioning portion of the first release member, both the first and second release members move toward the slot of the slide member to disengage the elastic arm of the second release member from the rear end of the stop recess so that the slide member is capable of moving in the channel member.

2. The slide assembly of claim 1, wherein the first release member is formed by punching, wherein the positioning portion of the first release member includes a raised first guiding section and a raised second guiding section which is raised, wherein the guiding portion of the first release member includes a guiding section engaged with the channel member, and wherein the guiding section is a curved surface or inclined surface.

3. The slide assembly of claim 2, wherein the guiding portion includes a guiding section urging against the channel member, and wherein width of the guiding section of the guiding portion is greater than width of the connection section of the connection portion of the first release member.

4. The slide assembly of claim 1, wherein the second release member is formed by punching, wherein the elastic arm of the second release member is bent upwardly, inwardly to form a first groove portion and a second groove portion, wherein height of the first groove portion of the elastic arm is less than height of the first guiding section of the positioning portion of the first release member, and wherein height of the first groove portion of the elastic arm is less than height of the second guiding section of the positioning portion of the first release member respectively.

5. The slide assembly of claim 4, wherein the fastening portion of the second release member includes a fastening hole formed with the elastic arm, and wherein both the connection portion of the slide member and the connection portion of the first release member are fastened in the fastening hole.

6. The slide assembly of claim 1, wherein two sides of the elastic arm of the second release member are bent upwardly, inwardly to form a first groove portion and a second groove portion, and wherein length of the positioning portion of the first release member is greater than each of length of the first groove portion of the elastic arm and length of the second groove portion of the elastic arm respectively.

\* \* \* \* \*